US012747798B2

(12) United States Patent
Wang et al.

(10) Patent No.: US 12,747,798 B2
(45) Date of Patent: Sep. 29, 2026

(54) CONTROL VALVE AND THERMAL MANAGEMENT SYSTEM

(71) Applicant: ZHEJIANG SANHUA AUTOMOTIVE COMPONENTS CO., LTD., Hangzhou (CN)

(72) Inventors: Lixin Wang, Hangzhou (CN); Jianhua Chi, Hangzhou (CN); Yuzhi Yang, Hangzhou (CN); Jinghui Zhu, Hangzhou (CN); Junqing Tu, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 0 days.

(21) Appl. No.: 18/868,214

(22) PCT Filed: May 23, 2023

(86) PCT No.: PCT/CN2023/095694
§ 371 (c)(1),
(2) Date: Nov. 22, 2024

(87) PCT Pub. No.: WO2023/226957
PCT Pub. Date: Nov. 30, 2023

(65) Prior Publication Data

US 2025/0327525 A1 Oct. 23, 2025

(30) Foreign Application Priority Data

May 23, 2022 (CN) ......................... 202210563010.0

(51) Int. Cl.
*F16K 11/087* (2006.01)
*F01P 7/14* (2006.01)
(Continued)

(52) U.S. Cl.
CPC ...... *F16K 11/0876* (2013.01); *F16K 11/0836* (2013.01); *F16K 11/0856* (2013.01);
(Continued)

(58) Field of Classification Search
None
See application file for complete search history.

(56) References Cited

U.S. PATENT DOCUMENTS 5,269,347 A * 12/1993 Beasley ................ F16K 11/163 137/887
6,230,668 B1 5/2001 Marsh et al.
(Continued)

FOREIGN PATENT DOCUMENTS

CN 108779865 A 11/2018
CN 109937317 A 6/2019
(Continued)

OTHER PUBLICATIONS

International Search Report for PCT/CN2023/095694 mailed Sep. 6, 2023, ISA/CN.
(Continued)

*Primary Examiner* — Atif H Chaudry
(74) *Attorney, Agent, or Firm* — Yue (Robert) Xu; Apex Attorneys at Law, LLP

(57) ABSTRACT

A control valve and a thermal management system are provided. The control valve includes a valve body assembly and a valve core assembly. The valve body assembly has a first cavity and a second cavity. The valve core assembly is at least partially located in the first cavity and at least partially located in the second cavity. The valve body assembly has a first communication port, a second communication port, and a first connection port in communication with both the first and second communication ports. The valve core assembly at least has a first working position
(Continued)

group and a second working position group. When in the first working position group, the valve core assembly closes the second communication port and opens the first communication port; when in the second working position group, the valve core assembly closes the first communication port and opens the second communication port.

14 Claims, 11 Drawing Sheets

(51) Int. Cl.

| | |
|---|---|
| ***F16K 11/083*** | (2006.01) |
| ***F16K 11/085*** | (2006.01) |
| ***F16K 11/22*** | (2006.01) |
| ***F16K 27/06*** | (2006.01) |

(52) U.S. Cl.
CPC ........ *F16K 11/087* (2013.01); *F16K 11/0873* (2013.01); *F16K 11/22* (2013.01); *F16K 27/067* (2013.01); *F01P 2007/146* (2013.01)

(56) References Cited

U.S. PATENT DOCUMENTS 6,647,934 B2 11/2003 Marsh et al.
8,356,627 B2 * 1/2013 Hoshi .................. G01F 15/005 137/557
2007/0039653 A1 * 2/2007 Maggard ................ F16K 11/22 137/625.19
2014/0290659 A1 * 10/2014 Chen ................ A61M 16/0006 128/205.24
2017/0321595 A1 11/2017 Jang et al.
2019/0072191 A1 3/2019 Shen et al.
2020/0019198 A1 1/2020 Qiu et al.
2023/0258271 A1 8/2023 Wang et al.

FOREIGN PATENT DOCUMENTS

CN 110843465 A 2/2020
CN 111828687 A 10/2020
CN 112013134 A 12/2020
CN 113623430 A 11/2021
CN 215928493 U 3/2022
CN 114517843 A 5/2022
DE 102016200737 A1 7/2017
KR 20170006273 A 1/2017

OTHER PUBLICATIONS

European Search Report issued on Apr. 29, 2026 for European counterpart application No. 23811028.2.

* cited by examiner

CONTROL VALVE AND THERMAL MANAGEMENT SYSTEM

The present application is the national phase of International Application No. PCT/CN2023/095694, titled "CONTROL VALVE AND THERMAL MANAGEMENT SYSTEM", filed on May 23, 2023, which claims the priority of the Chinese Patent Application No. 202210563010.0, titled "CONTROL VALVE", filed with the China National Intellectual Property Administration on May 23, 2022, the entire disclosures of which are incorporated herein by reference.

FIELD

The present application relates to the technical field of fluid control, and in particular to a control valve and a thermal management system.

BACKGROUND

In the field of vehicles, a multi-way control valve is used in a thermal management system of the vehicle to control flow paths. The control valve includes a valve body and a valve core, where the valve core is rotatably arranged in a valve cavity of the valve body. As shown in FIG. 21, two cavities S and K are provided for fluid flow in the control valve, where two paths of fluids flow in the two cavities respectively at the same time, and temperatures of the two paths of fluids may be different. If fluid exchange occurs between the two paths of fluids, thermal efficiency of the system may be reduced.

SUMMARY

An object of the present application is to provide a control valve and a thermal management system, to reduce fluid exchange between two cavities.

A control valve is provided according an embodiment of the present application, including a valve body assembly and a valve core assembly. The valve body assembly is provided with a first cavity and a second cavity. At least part of the valve core assembly is located in the first cavity, and at least another part of the valve core assembly is located in the second cavity. The valve body assembly is provided with a first communication port and a second communication port, where the second communication port is located at a wall defining the first cavity, and the first communication port is located at a wall defining the second cavity. The valve body assembly has a first connection port, and both the first communication port and the second communication port are in communication with the first connection port. The valve core assembly has at least a first operating position group and a second operating position group, and the valve core assembly opens the first connection port. When in the first operating position group, the valve core assembly closes the second communication port and opens the first communication port; and when in the second operating position group, the valve core assembly closes the first communication port and opens the second communication port.

A thermal arrangement system is provided according to another embodiment of the present application, including the control valve described above.

In the control valve and the thermal arrangement system provided in the embodiments of the present application, both the first communication port and the second communication port are in communication with the first connection port. The valve core assembly is at least provided with a first operating position group and a second operating position group. When in the first operating position group, the valve core assembly closes the second communication port and opens the first communication port; when in the second operating position group, the valve core assembly closes the first communication port and opens the second communication port. Thus, when in the first operating position group and the second operating position group, the second cavity is not in communication with the first cavity, thereby reducing mixing of the fluid in the first cavity with the fluid in the second cavity.

DETAILED DESCRIPTION OF THE EMBODIMENTS

Figure 1:
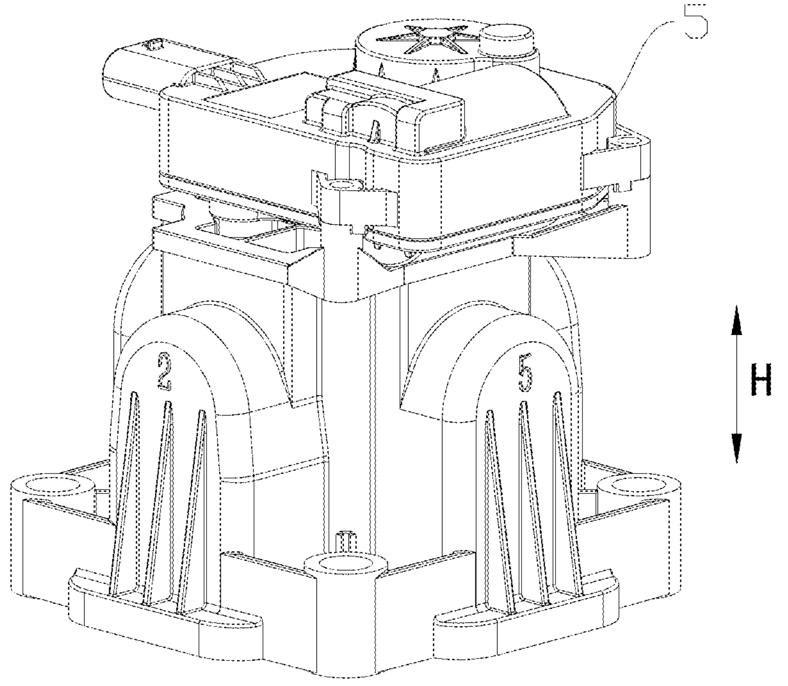
FIG. 1 is a schematic perspective view showing the structure of a control valve according to an embodiment of the present application.

In the description of the present application, it should be noted that the orientation or positional relationship indicated by the terms, such as "central", "longitudinal", "transversal", "upper", "lower", "front", "rear", "left", "right", "vertical", "horizontal", "top", "bottom", "inner", "outer" and the like, are based on the orientation or positional relationship shown in the drawings, which are only used to facilitate the description of the present application and to simplify the description, rather than indicating or implying that the device or element referred to must have a specific orientation, or can only be configured and operated in a particular orientation. Therefore the above terms should not be construed as a limitation to the present application.

The embodiments are described in detail hereinafter in conjunction with the accompanying drawings.

As shown in FIG. 1 to FIG. 5, a control valve includes a valve body assembly 1, a valve core assembly 2 and a driving part 5. The valve body assembly 1 is provided with a valve cavity 100, the valve core assembly 2 is at least partially located in the valve cavity 100, and the valve core assembly 2 can be driven by the driving part 5 to rotate. The valve core assembly 2 can rotate around a rotation axis X-X, and a position detection element may be provided in the driving part 5 for detecting a rotation angle of the valve core assembly 2. A height direction is defined as H, which is parallel or substantially parallel to an extension direction of the rotation axis of the valve core assembly 2. In the present application, "rotation axis" refers to the rotation axis of the valve core assembly 2, "circumferential direction" refers to the circumferential direction of the valve core assembly 2, and "radial direction" refers to the radial direction of the valve core assembly 2 or a direction parallel to the radial direction of the valve core assembly 2.

As shown in FIG. 5 to FIG. 9, the valve body assembly 1 has seven communication ports, including a first communication port 101, a second communication port 102, a third communication port 103, a seventh communication port 107, a fifth communication port 105, a sixth communication port 106 and a fourth communication port 104. The seven communication ports are located at a wall defining the valve cavity 100. The valve body assembly 1 has five connection ports, including a fourth connection port 114, a first connection port 111, a third connection port 113, a second connection port 112 and a fifth connection port 115. The sixth communication port 106 is in communication with the third connection port 113, the fifth communication port 105 is in communication with the fourth connection port 114, the seventh communication port 107 is in communication with the fifth connection port 115, the third communication port 103 is in communication with the second connection port 112, both the first communication port 101 and the second communication port 102 are in communication with the first connection port 111, and the fourth communication port 104 is in communication with the second connection port 112.

A part of the valve core assembly 2 located in the valve cavity 100 has a first communicating portion 211 and a second communicating portion 221, and each of the communicating portions is able to communicate two or more communication ports to realize communication between at least two connection ports. The valve core assembly 2 can open or close the communication ports. "Closing the communication port" means cutting off the communication or circulation between the communication port and the valve cavity 100, and "opening the communication port" means communicating the communication port with the valve cavity 100 or communicating the communication port with at least one of the communicating portions. The first communicating portion 211 includes a first communicating cavity and a wall portion defining the first communicating cavity. Similarly, the second communicating portion 221 includes a second communicating cavity and a wall portion defining the second communicating cavity.

As shown in FIG. 5 to FIG. 9, the valve body assembly 1 includes a valve cover 17, a housing 16, and a partition wall portion 11. The partition wall portion 11 is at least partially located in the housing 16, and the valve cover 17 closes an opening at an upper end of the housing 16. The valve body assembly 1 includes a first cavity 3 and a second cavity 4, where at least part of the first cavity 3 and at least part of the second cavity 4 are located at different heights of the valve body assembly 1, and the partition wall portion 11 separates the first cavity 3 from the second cavity 4. A temperature of a fluid in the first cavity 3 may be different from a temperature of a fluid in the second cavity 4. The partition wall portion 11 can separate the fluid in the first cavity 3 from the fluid in the second cavity 4, thus reducing the mixing of the fluid in the first cavity 3 and the fluid in the second cavity 4, and thereby improving the thermal efficiency.

Specifically, the sixth communication port 106, the second communication port 102 and the third communication port 103 are provided at the wall defining the first cavity 3, and the seventh communication port 107, the fifth communication port 105, the first communication port 101 and the seventh communication port 107 are provided at the wall defining the second cavity 4. The first communicating portion 211 is located in the first cavity 3, and the communicating portion 221 is located in the second cavity 4. In this embodiment, the partition wall portion 11 has a first through hole 19, and a part of the valve core assembly 2 is located in the first through hole 19. The partition wall portion 11 is hermetically arranged with the valve core assembly 2, and the partition wall portion 11 is hermetically arranged with the housing 16. Specifically, the partition wall portion 11 is welded with the housing 16, or in an interference fit with the housing 16, or integrally formed with the housing 16.

In other embodiments, the partition wall portion 11 is integrally formed with the valve core assembly 2, and the partition wall portion 11 is slidably sealed with the wall defining the valve cavity 100. Or, the partition wall portion 11 is slidably sealed with the housing 16, and the valve core assembly 2 is hermetically arranged with the wall defining the first through hole 19. This integrally formed valve core assembly 2 is convenient to assemble.

As shown in FIG. 5 to FIG. 9, the valve core assembly 2 includes a first valve core portion 21 and a second valve core portion 22. The first valve core portion 21 and the second valve core portion 22 are arranged along an axial direction of the valve core assembly 2, and the first valve core portion 21 is in transmission connection with the second valve core portion 22. The first communicating portion 211 is located in the first valve core portion 21, and the second communicating portion 221 is located in the second valve core portion 22. The second valve core portion 22 can drive the first valve core portion 21 to rotate, so as to allow the transmission connection therebetween. The second valve core portion 22 and the first valve core portion 21 may be directly connected to each other or may be in transmission connection with each other via other components. The first valve core portion 21 is located in the first cavity 3, and the second valve core portion 22 is located in the second cavity 4.

An outer wall of the first valve core portion 21 is a part of a virtual spherical shape, and the second communication port 102 and the third communication port 103 can face the outer wall of the first valve core portion 21. In other embodiments, the outer wall of the first valve core portion 21 may also be a part of a virtual column shape or a part of another revolving body. An outer wall of the second valve core portion 22 is a part of a virtual spherical shape, and the seventh communication port 107, the fifth communication port 105, the first communication port 101 and the fourth communication port 104 face the outer wall of the second valve core portion 22.

In other embodiments, the outer wall of the second valve core portion 22 may also be a part of a virtual column shape or a part of another revolving body, and a revolving axis of the revolving body is the rotation axis of the valve core assembly 2.

Figure 6:
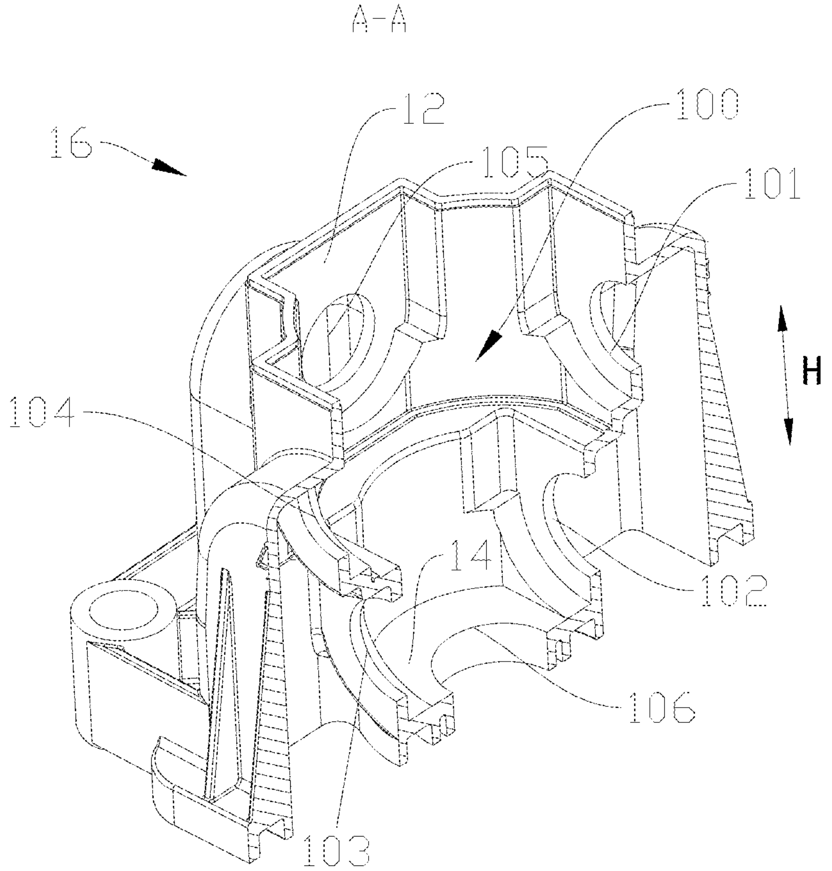
FIG. 6 is a schematic perspective cross-sectional view showing the structure of a housing of the control valve in FIG. 4 taken along line A-A.
Figure 7:
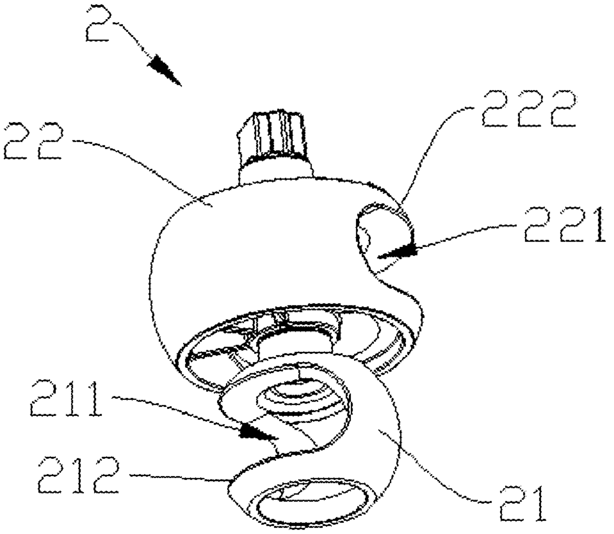
FIG. 7 is a schematic perspective view showing the structure of a valve core assembly of the control valve in FIG. 5.
Figure 8:
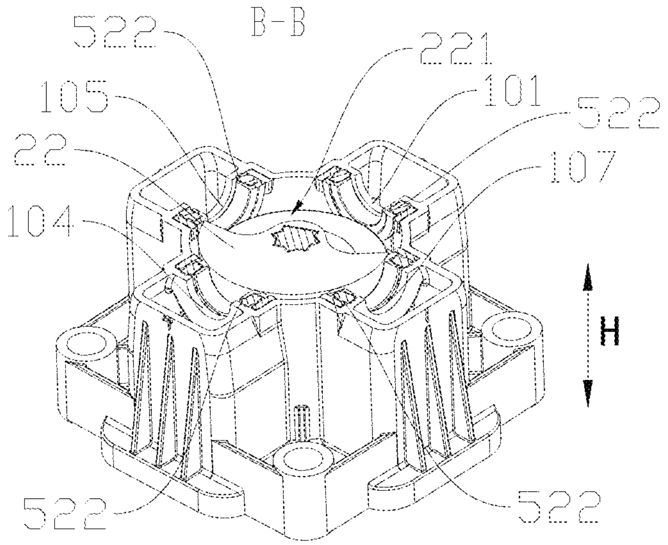
FIG. 8 is a schematic cross-sectional view showing the structure of the control valve in FIG. 4 taken along line B-B.
Figure 9:
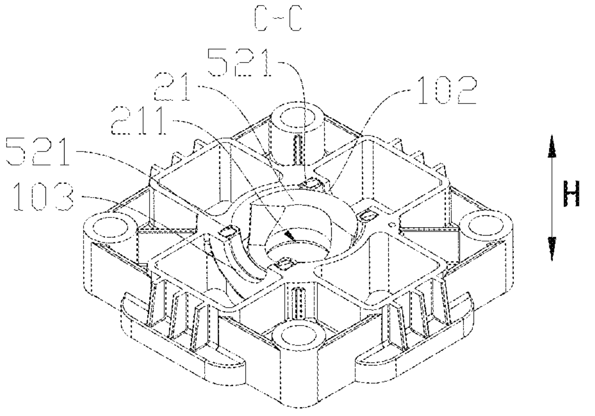
FIG. 9 is a schematic cross-sectional view showing the structure of the control valve in FIG. 4 taken along line C-C.

As shown in FIG. 6, the wall defining the valve cavity 100 includes a side wall 12 and a bottom wall 14. In the height direction H, the bottom wall 14 is located on one side of the valve body assembly 1. The side wall 12 extends in the height direction, and the side wall 12 circumferentially surrounds the valve cavity 100.

As shown in FIG. 5 to FIG. 9, the control valve includes at least one first sealing member 521, at least one second sealing member 522 and a third sealing member 18. The first sealing member 521 is located between the wall defining the first cavity 3 and the first valve core portion 21, and the second sealing member 522 is located between the wall defining the second cavity 4 and the second valve core portion 22. The first sealing member 521 and the second sealing member 522 cooperate with the valve core assembly 2 to close or open the communication port.

In this embodiment, one of the first sealing members 521 is located around the second communication port 102 and another one of the first sealing members 521 is located around the third communication port 103. A part of the first sealing member 521 is complementary in shape to the outer wall of the first valve core portion 21 and is sealingly contact with the outer wall of the first valve core portion 21.

One of the second sealing members 522 is located around the seventh communication port 107, anther one of the second sealing members 522 is located around the fifth communication port 105, yet another one of the second sealing members 522 is located around the first communication port 101, and still another one of the second sealing members 522 is located around the fourth communication port 104. A part of the second sealing member 522 is complementary in shape to the outer wall of the second valve core portion 22 and is sealingly contact with the outer wall of the second valve core portion 22.

The third sealing member 18 is in contact with the valve core assembly 2 and the partition wall portion 11. The third sealing member 18 is used to prevent fluid exchange between the first cavity 3 and the second cavity 4 through the first through hole 19. The third sealing member 18 may be a sealing ring with a cross section of an "X" shape.

As shown in FIG. 5 to FIG. 9, along the height direction H, the seventh communication port 107, the fifth communication port 105, the first communication port 101 and the fourth communication port 104 are located in substantially a same height range and at different radial directions. The third communication port 103 and the second communication port 102 are located in substantially a same height range and at different radial directions. The sixth communication port 106 and the second communication port 102 are located at different heights. That is, the communication ports are located in at least two different height ranges. This arrangement is beneficial to reducing the number of ports in the same height range, in other words, reducing the positions occupied by the connection ports in the same height range, thereby reducing size of the valve cavity 100 and the valve core assembly 2 in the radial direction, which makes the fluid resistance of the control valve relatively small and the torque required to rotate the valve core assembly 2 relatively small. In addition, such arrangement of the communication ports makes the size of the control valve in the radial direction relatively compact, which facilitates integration with a flow passage plate, in other words, a mounting area of the flow passage plate for mounting with the control valve can be relatively small.

In other embodiments, a certain deviation between the communication ports is permissible, and the sizes of the communication ports may be different. In this case, the communication ports may meet following requirements: a middle part of an opening of the second communication port 102 is located at a height within a height range of an opening of the third communication port 103, a middle part of an opening of the fifth communication port 105 is located at a height within a height range of an opening of the first communication port 101, the middle part of an opening of the seventh communication port 107 is located at a height within the height range of the opening the first communication port 101, and a middle part of an opening of the fourth communication port 104 is located at a height within the height range of the opening of the first communication port 101.

In this embodiment, the first communication port 101 and the third communication port 103 are located at different heights. The first communication port 101, the second communication port 102, the third communication port 103, the seventh communication port 107, the fifth communication port 105 and the fourth communication port 104 are all located at the side wall 12. The sixth communication port 106 is located at the bottom wall 14, and the sixth communication port 106 is located at a height different from the height of the first communication port 101 and the height of the third communication port 103. That is to say, the communication ports are distributed in at least three different height ranges, which can further reduce the size of the valve cavity 100 and the valve core assembly 2 in the radial direction. In the height direction H, the sixth communication port 106 is located at one side of the first valve core portion 21. For the first valve core portion 21, only two of the communication ports are provided in the circumferential direction of the first valve core portion 21, which can reduce the size of the first valve core portion 21 in the radial direction and further reduce the torque for rotating the first valve core portion 21.

Specifically, a part of the first communicating portion 211 is arranged coaxially with the rotation axis and forms an opening at an axial side of the first valve core portion 21. The first communicating portion 211 is always in communication with the sixth communication port 106. The first valve core portion 21 is provided as an on-off valve, which only needs to be able to selectively close the third communication port 103 or the second communication port 102 and does not need to have a function of adjusting flow rate. A center of the sixth communication port 106 is provided coaxially or substantially coaxially with the rotation axis of the valve core assembly 2. In addition, the size of the first valve core portion 21 in the radical direction is smaller than that of the second valve core portion 22, that is, the valve core assembly 2 has a structure with a large upper part and a small lower part. When assembling the control valve, the first valve core portion 21 with a small diameter is mounted in the valve cavity 100 firstly, and then the partition wall portion 11 and the second valve core portion 22 with a large diameter are mounted in the valve cavity 100, which facilitates mounting the valve core assembly 2 into the valve cavity 100 from an upper opening of the housing 16.

Both the first communication port 101 and the second communication port 102 are in communication with a flow passage of the control valve. The first communication port 101 and the second communication port 102 are located in the same radial direction, so that the flow passage for connecting the first communication port 101 and the second communication port 102 is short in length and relatively compact in volume. The fourth communication port 104 and the third communication port 103 are located in substantially the same radial direction. In other embodiments, a certain deviation between the communication ports is permissible, and the sizes of the communication ports may be different. For example, the center of the first communication port 101 and the center of the second communication port 102 are arranged around the rotation axis at an interval of 0 degrees to 10 degrees, and the center of the fourth communication port 104 and the center of the third communication port 103 are arranged around the rotation axis at an interval of 0 degrees to 10 degrees.

The first communicating portion 211 is able to communicate the sixth communication port 106 with the second communication port 102, the first communicating portion 211 is able to communicate the sixth communication port 106 with the third communication port 103, the second communicating portion 221 is able to communicate the first communication port 101 with the seventh communication port 107, the second communicating portion 221 is able to communicate the first communication port 101 with the fifth communication port 105, the second communicating portion 221 is able to communicate the fifth communication port 105 with the fourth communication port 104, and the second communicating portion 221 is able to communicate the seventh communication port 107 with the fourth communication port 104.

In this embodiment, the valve body assembly 1 has seven communication ports and five connection ports. The valve body assembly 2 is rotated to different positions relative to the valve body assembly 1 to define different operating modes, as shown in FIG. 13 to FIG. 18. Unidirectional arrows in FIG. 13 to FIG. 18 show one type of flow path of the fluid within the control valve 100, and the control valve in this embodiment has at least six operating modes.

In a first operating mode (a), the third connection port 113 is in communication with the second connection port 112 through the sixth communication port 106, the first communicating portion 211 and the third communication port 103. The first connection port 111 is in communication with the fifth connection port 115 through the first communication port 101, the second communicating portion 221 and the seventh communication port 107. The fourth connection port 114 is not in communication with any other connection ports.

In a second operating mode (b), the third connection port 113 is in communication with the second connection port 112 through the sixth communication port 106, the first communicating portion 211 and the third communication port 103. The first connection port 111 is in communication with the fourth connection port 114 through the first communication port 101, the second communicating portion 221 and the fifth communication port 105. The fifth connection port 115 is not in communication with any other connection ports.

In a third operating mode (c), the third connection port 113 is in communication with the first connection port 111 through the sixth communication port 106, the first communicating portion 211 and the second communication port 102. The second connection port 112 is in communication with the fourth connection port 114 through the fourth communication port 104, the second communicating portion 221 and the fifth communication port 105. The fifth connection port 115 is not in communication with any other connection ports.

In a fourth operating mode (d), the third connection port 113 is in communication with the first connection port 111 through the sixth communication port 106, the first communicating portion 211 and the second communication port 102. The second connection port 112 is in communication with the fifth connection port 115 through the fourth communication port 104, the second communicating portion 221 and the seventh communication port 107. The fourth connection port 114 is not in communication with any other connection ports.

In a fifth operating mode (e), the third connection port 113 is in communication with the second connection port 112 through the sixth communication port 106, the first communicating portion 211 and the third communication port 103. The first connection port 111 is in communication with the fifth connection port 115 through the first communication port 101, the second communicating portion 221 and the seventh communication port 107. The first connection port 111 is in communication with the fourth connection port 114 through the first communication port 101, the second communicating portion 221 and the fifth communication port 105. In this operating mode, both the fourth connection port 114 and the fifth connection port 115 are in communication with the first connection port 111, and a ratio of a flow amount flowing into the first connection port 111 from the fourth connection port 114 to a flow amount flowing into the first connection port 111 from the fifth connection port 115 can be adjusted by controlling the valve core assembly 2. For example, in FIG. 17, in the flow amount of the fluid flowing into the first connection port 111, 50% of the flow amount is from the fourth connection port 114 and 50% of the flow amount is from the fifth connection port 115.

In a sixth operating mode (f), the third connection port 113 is in communication with the first connection port 111 through the sixth communication port 106, the first communicating portion 211 and the second communication port 102. The second connection port 112 is in communication with the fourth connection port 114 through the fourth communication port 104, the second communicating portion 221 and the fifth communication port 105. The second connection port 112 is in communication with the fifth connection port 115 through the fourth communication port 104, the second communicating portion 221 and the seventh communication port 107. In this operating mode, both the fourth connection port 114 and the fifth connection port 115 are in communication with the second connection port 112, and a ratio of the a flow amount flowing into the second connection port 112 from the fourth connection port 114 to a flow amount flowing into the second connection port 112 from the fifth connection port 115 can be adjusted by controlling the valve core assembly 2. For example, in FIG. 18, in the flow amount of the fluid flowing into the second connection port 112, 50% of the flow amount is from the fourth connection port 114 and 50% of the flow amount is from the fifth connection port 115.

In the first operating mode (a), the second operating mode (b), the third operating mode (c) and the fourth operating mode (d), the control valve has only a communication function without a flow amount adjustment function, whereas in the fifth operating mode (e) and the sixth operating mode (f), the control valve has the flow amount adjustment function. Both the first communication port 101 and the second communication port 102 are in communication with the first connection port 111, that is, the two communication ports share a common connection port, therefore, the first connection port 111 can be selectively in communication with at least three other connection ports, thus increasing the function of the first connection port 111, in addition, the structure of the valve core assembly 2 is relatively simple, and the communicating portions are relatively less. Similarly, both the fourth communication port 104 and the third communication port 103 are in communication with the second connection port 112, therefore, the second connection port 112 can be selectively in communication with at least three other connection ports, thus increasing the function of the second connection port 112.

In this embodiment, the fourth connection port 114, the fifth connection port 115 and the third connection port 113 are fluid inlets, and the first connection port 111 and the second connection port 112 are fluid outlets. In another embodiment, the fourth connection port 114, the fifth connection port 115 and the third connection port 113 are fluid outlets, and the first connection port 111 and the second connection port 112 are fluid inlets. In this case, in the fifth operating mode (e), a ratio of the flow amount flowing into the fourth connection port 114 from the first connection port 111 to the flow amount flowing into the fifth connection port 115 from the first connection port 111 can be adjusted by controlling the valve core assembly 2; in the sixth operating mode (f), a ratio of the flow amount flowing into the fourth connection port 114 from the second connection port 112 to the flow amount flowing into the fifth connection port 115 from the second connection port 112 can be adjusted by controlling the valve core assembly 2.

As shown in FIG. 8 to FIG. 12, the seventh communication port 107, the first communication port 101, the fifth communication port 105 and the fourth communication port 104 are circumferentially distributed in the listed sequence. A center of the first communication port 101 and a center of the fourth communication port 104 are arranged around the rotation axis at an interval of 120 degrees to 180 degrees, with the interval angle indicated by β2 in FIG. 12. A center of the seventh communication port 107 and a center of the fifth communication port 105 are arranged around the rotation axis at an interval of 120 degrees to 180 degrees, with the interval angle indicated by β1 in FIG. 12. Thus, when the second communicating portion 221 is rotated to different positions, the second valve core portion 22 is able to close any two adjacent communication ports of the seventh communication port 107, the fifth communication port 105, the first communication port 101 and the fourth communication port 104, while the second communicating portion 221 is able to communicate the other two adjacent communication ports.

Accordingly, a center of the second communication port 102 and a center of the third communication port 103 are arranged around the rotation axis at an interval of 120 degrees to 180 degrees.

In this embodiment, as shown in FIG. 8 to FIG. 12, the first communication port 101, the seventh communication port 107, the fifth communication port 105 and the fourth communication port 104 are rotationally and symmetrically arranged along the circumferential direction of the valve core assembly 2, that is, the above four communication ports are arranged in a cross-shape. This arrangement of the communication ports can further reduce the size of the valve cavity 100 in the radial direction, resulting in a relatively small fluid resistance and a relatively compact volume of the control valve. In addition, the first operating mode (a), the second operating mode (b), the third operating mode (c) and the fourth operating mode (d) only have a communication function, corresponding to four different rotated positions of the valve core assembly 2, respectively, the four different rotated positions each has a certain range, and in one of the above ranges, the control valve maintains a same operating mode. With the communication ports being arranged in the cross-shape, the range is larger, that is, the sealing range of the control valve is larger, which relatively reduces the requirement for the control accuracy of the valve core assembly 2. For example, in the first operating mode (a), the second operating mode (b), the third operating mode (c) and the fourth operating mode (d), the permissible control deviation of the rotation angle of the valve core assembly 2 may be expanded to 5 degrees.

As shown in FIG. 5 to FIG. 12, the first communicating portion 211 has a first opening 212 at the outer wall of the valve core assembly 2, and the second communicating portion 221 has a second opening 222 at the outer wall of the valve core assembly 2, and the first opening 212 and the second opening 222 are located at different heights in the height direction H. The first opening 212 is located in substantially the same height range as the second communication port 102, and the second communication port 102 is located in substantially the same height range as the sixth communication port 106, which allows the first opening 212 to at least partially face one or both of the sixth communication port 106 and the second communication port 102. The second opening 222 is located in substantially the same height range as the first communication port 101, and the first communication port 101 is located in substantially the same height range as the fourth communication port 104, the fifth communication port 105 and the fourth communication port 104, which allows the second opening 222 to at least partially face one or two of the seventh communication port 107, the fifth communication port 105, the first communication port 101 and the fourth communication port 104. In other embodiments, a certain deviation between the above openings and the communication ports is permissible and the sizes of the communication ports may be different. In this case, the following can be satisfied between the above openings and the communication ports: the middle part of the first opening 212 is located at a height in the height range of the opening of the second communication port 102, and the middle part of the second opening 222 is located at a height in the height range of the opening of the first communication port 101.

Figure 10:
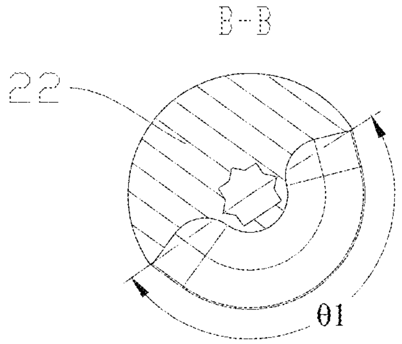
FIG. 10 is a schematic perspective cross-sectional view showing the structure of a second valve core portion of the control valve in FIG. 4 taken along line B-B.

As shown in FIG. 10, in this embodiment, the second communicating portion 221 has only a second opening 222 within the height range of the second opening 222. The second valve core portion 22 is provided with only one communicating portion, that is, the second communicating portion 221, therefore in a case that the size of the second valve core portion 22 in the radial direction remains unchanged, the second opening 222 can be provided with a larger size, and a flow area of the second communicating portion 221 can be larger, so as to reduce the flow resistance of the fluid flowing through the second communicating portion 221.

Figure 11:
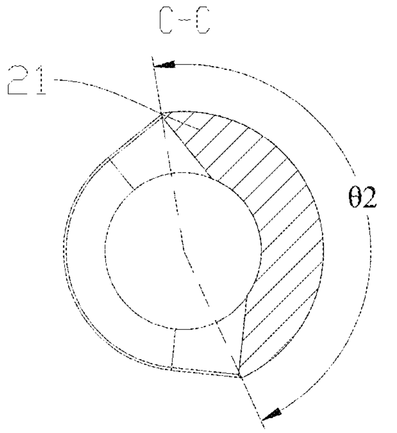
FIG. 11 is a schematic perspective cross-sectional view showing the structure of a first valve core portion of the control valve in FIG. 4 taken along line C-C.
Figure 12:
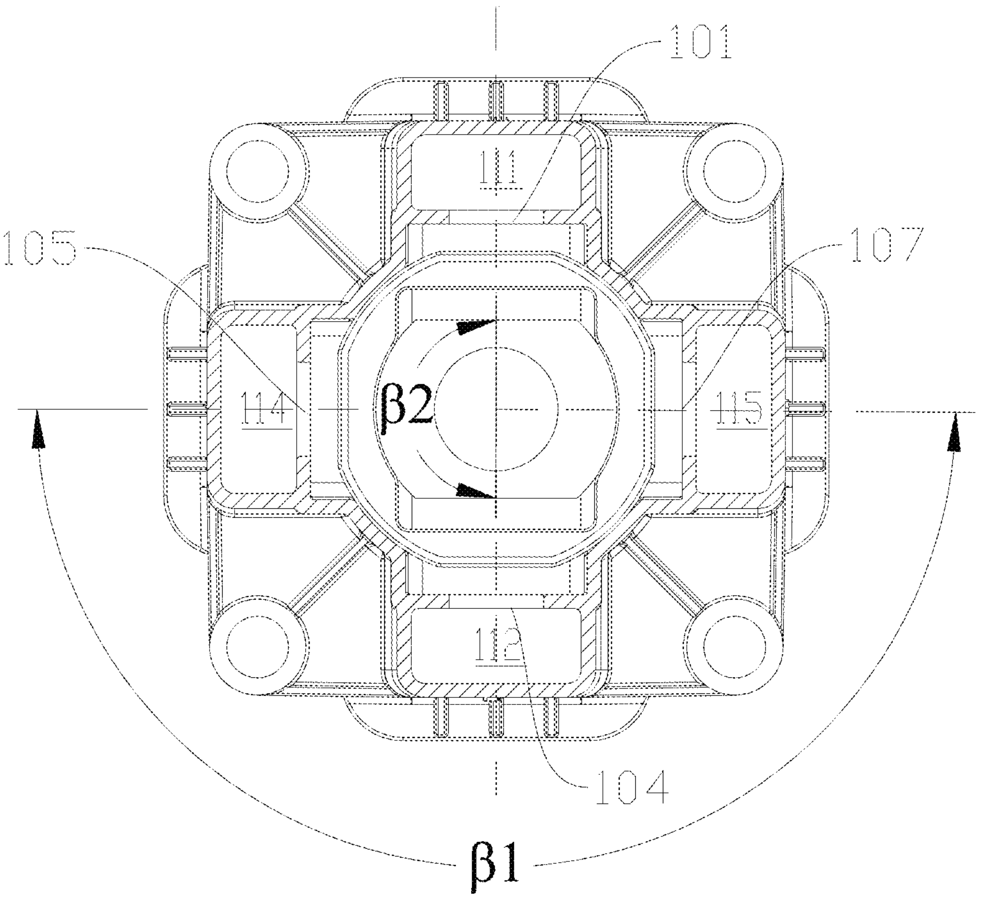
FIG. 12 is a schematic cross-sectional view showing the structure of the housing of the control valve in FIG. 4 taken along line B-B.
Figure 13:
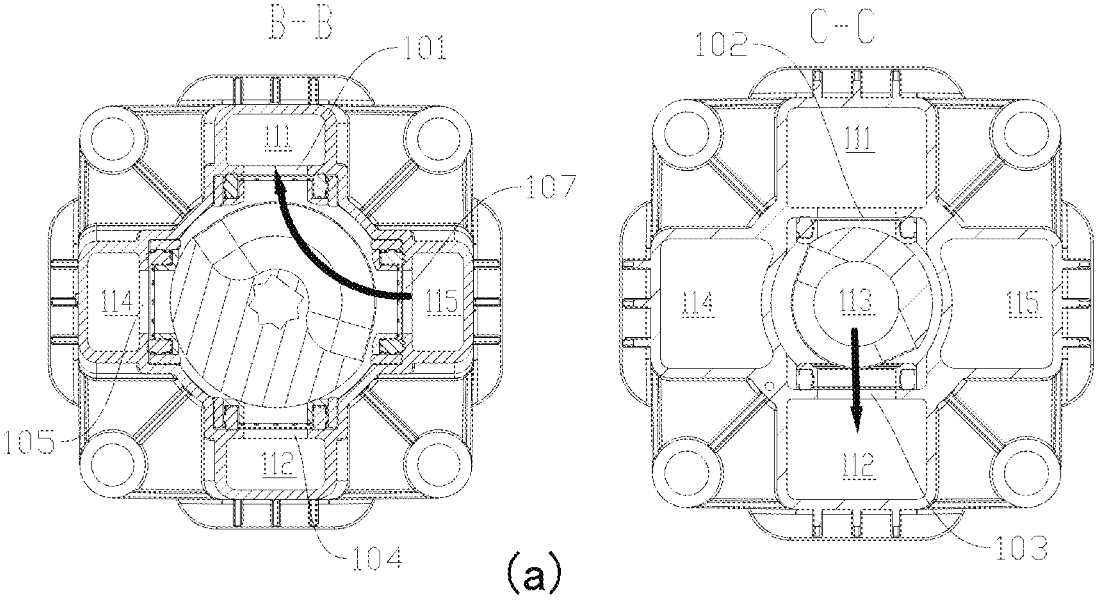
FIG. 13 is a schematic cross-sectional view showing the structure of the control valve in FIG. 4 in a first operating mode taken along line B-B and line C-C.
Figure 14:
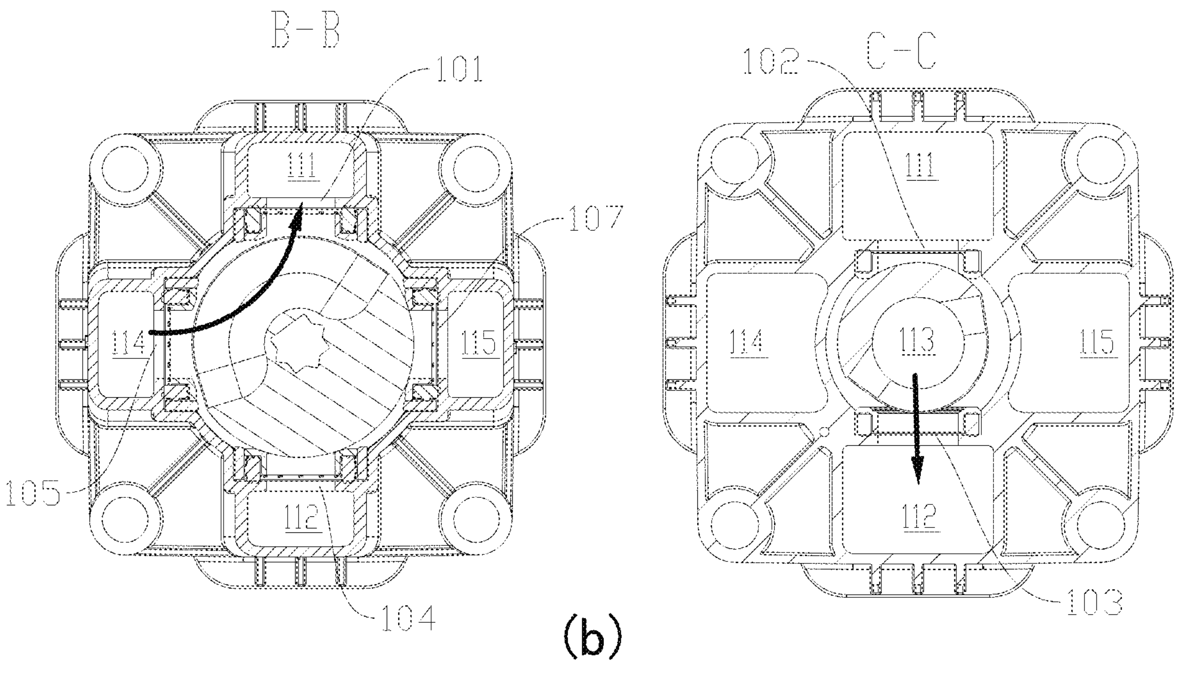
FIG. 14 is a schematic cross-sectional view showing the structure of the control valve in FIG. 4 in a second operating mode taken along line B-B and line C-C.
Figure 15:
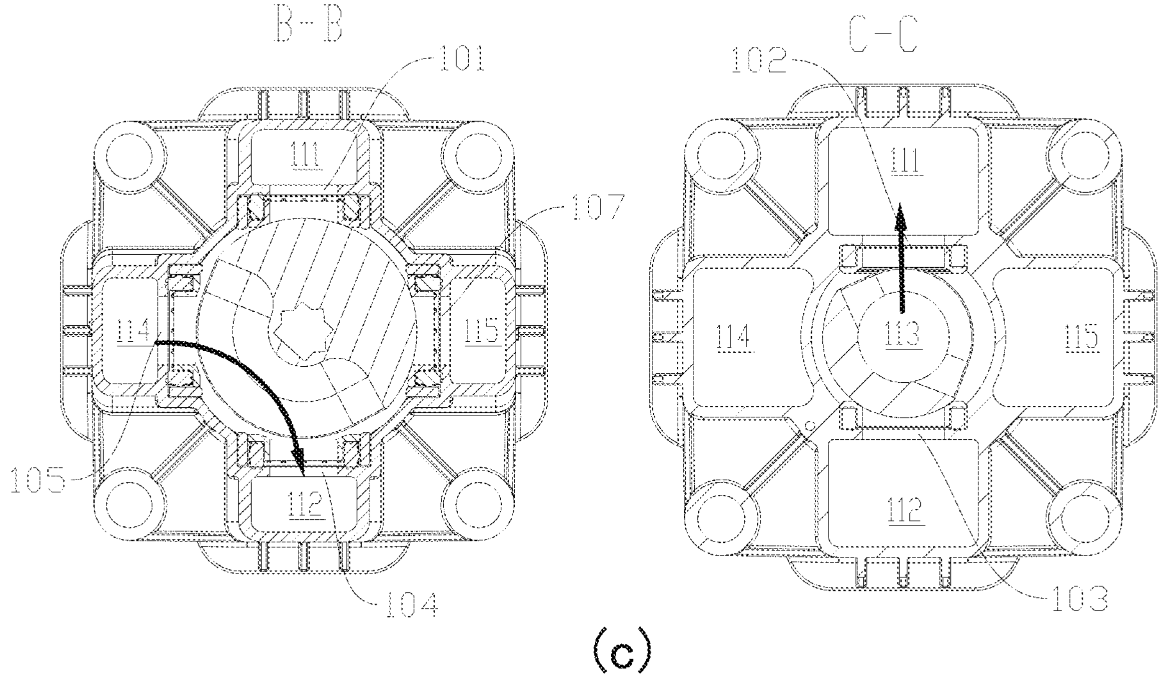
FIG. 15 is a schematic cross-sectional view showing the structure of the control valve in FIG. 4 in a third operating mode taken along line B-B and line C-C.
Figure 16:
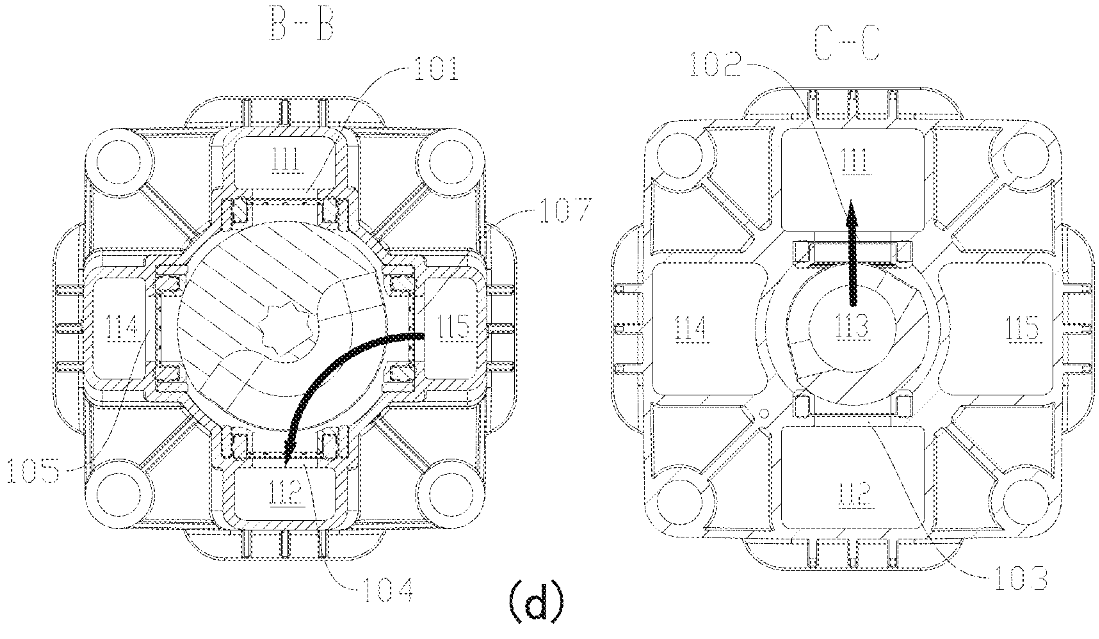
FIG. 16 is a schematic cross-sectional view showing the structure of the control valve in FIG. 4 in a fourth operating mode taken along line B-B and line C-C.
Figure 17:
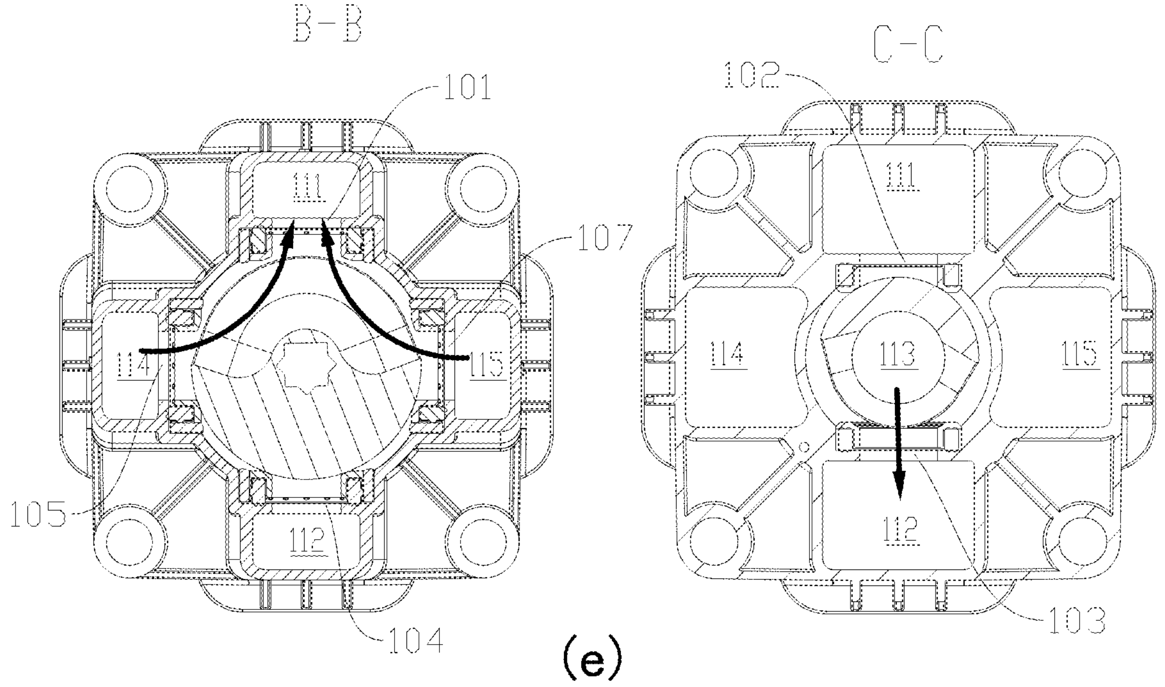
FIG. 17 is a schematic cross-sectional view showing the structure of the control valve in FIG. 4 in a fifth operating mode taken along line B-B and line C-C.
Figure 18:
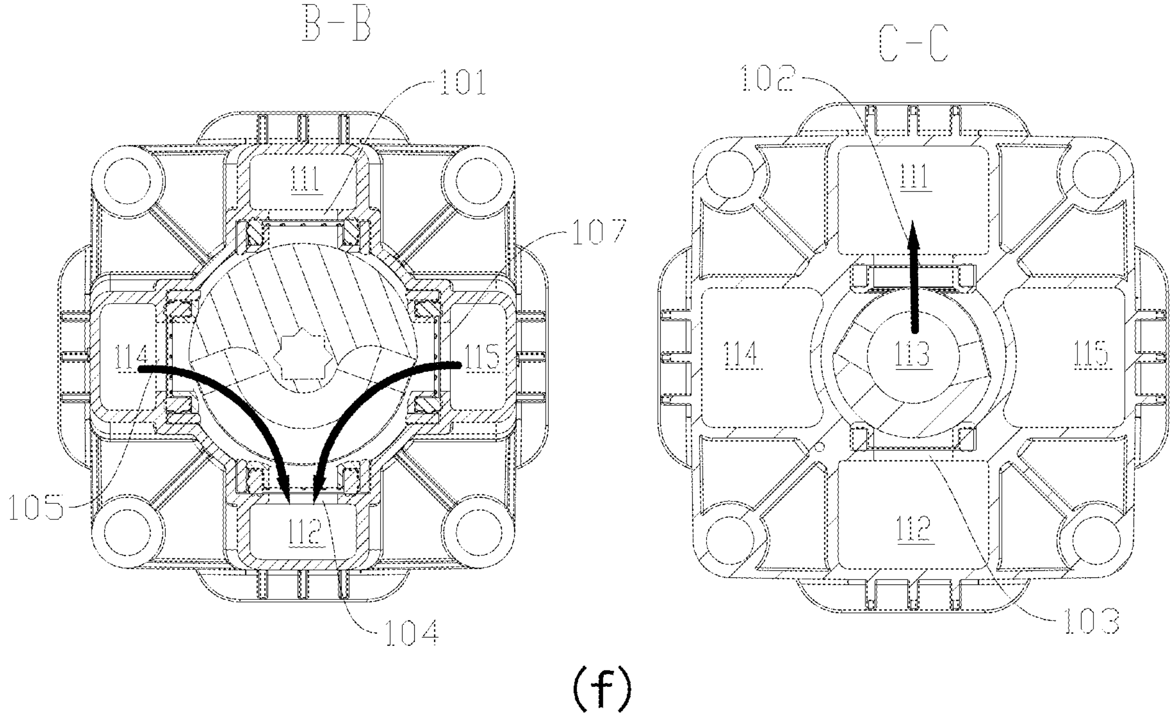
FIG. 18 is a schematic cross-sectional view showing the structure of the control valve in FIG. 4 in a sixth operating mode taken along line B-B and line C-C.

As shown in FIG. 11, two circumferential ends of the second opening 222 are located at an interval of 160 degrees to 200 degrees around the rotation axis, with the interval angle indicated by θ2 in FIG. 11, so that the second communicating portion 221 has a larger span along the circumferential direction, and is able to be in communication with three communication ports at the same time, thus realizing the function of flow amount adjustment in the fifth operating mode (e) and the sixth operating mode (f). In addition, a part of the outer wall of the valve core assembly 2 is located at the same height as the second opening 222, this part of the outer wall can be used to close the communication ports at the same height, and the interval angle of the above second opening 222 enables the second valve core portion 22 to have a larger range for closing.

The first communicating portion 211 has only the first opening 212 within the height range of the first opening 212. The first valve core portion 21 has only one communicating portion, that is, the first communicating portion 211. Two circumferential ends of the first opening 212 are located at an interval of 160 degrees to 200 degrees around the rotation axis, with the interval angle indicated by θ1 in FIG. 10, and similarly, the flow resistance of the fluid flowing through the first communicating portion 211 can be reduced or the size of the first valve core portion 21 in the radial direction can be reduced. A part of the outer wall of the valve core assembly 2 is located at the same height as the first opening 212, and this part of the outer wall may be used to close the communication port at the same height.

In a direction perpendicular to the rotation axis, the first opening 212 and the second opening 222 are oriented opposite to each other. Specifically, the center of the first opening 212 and the center of the second opening 222 are provided around the rotation axis at an interval of 160 degrees to 200 degrees, such that at most of rotated positions of the valve core assembly 2, the second communication port 102 and the first communication port 101 are not simultaneously in communication with the first connection port 111, to avoid reduction of the thermal efficiency due to the fluids in the first cavity 3 and the second cavity 4 being mixed through the second communication port 102 and the first communication port 101.

Similarly, at most of rotated positions of the valve core assembly 2, the third communication port 103 and the fourth communication port 104 are not simultaneously in communication with the second connection port 112, to avoid the fluids in the first cavity 3 and the second cavity 4 from being mixed. Corresponding to the opening structure described above, the valve core assembly 2 has at least a first operating position group and a second operating position group, where the first operating position group corresponds to at least two operating positions of the valve core assembly 2, and the second operating position group corresponds to at least two operating positions of the valve core assembly 2. Specifically, in the first operating position group, the valve core assembly 2 closes the second communication port 102, the valve core assembly 2 closes the fourth communication port 104, the first communication port 101 is in communication with at least one of the seventh communication port 107 and the fifth communication port 105 through the second communicating portion 221, and the third communication port 103 is in communication with the sixth communication port 106 through the first communicating portion 211. In the second operating position group, the valve core assembly 2 closes the first communication port 101, the valve core assembly 2 opens the fourth communication port 104, the fourth communication port 104 is in communication with at least one of the seventh communication port 107 and the fifth communication port 105 through the second communicating portion 221, and the second communication port 102 is in communication with the sixth communication port 106 through the first communicating portion 211. For example, in this embodiment, the first operating position group may correspond to one or more of the first operating mode (a), the second operating mode (b) and the fifth operating mode (e); and the second operating position group may correspond to one or more of the fourth operating mode (d), the third operating mode (c) and the sixth operating mode (f). The control valve can realize one operating mode when the valve core assembly 2 is at each of the operating positions.

When in use, a control valve of a thermal management system is connected to the thermal management system, the five connection ports of the control valve may be in communication with the radiator, pump, battery cooler and the like in the vehicle, and the fluid inside the control valve may be a coolant, such as a water-glycol mixture. The thermal management system may select one or two or more of the above six operating modes, which may be selected and controlled according to the needs of the system, for example, selecting the first operating mode (a), the second operating mode (b), the third operating mode (c) and the fourth operating mode (d) thereof. In addition, according to the needs of the system, the communication mode between the connection ports is not limited to the above, and different communication modes may be realized by changing parameters such as the number, shape and position of the communicating portions, and the number, position and shape of the communication ports.

For example, in one embodiment of the control valve, the number of the communication ports, the number of the connection ports and the positions thereof are kept the same as in the previous embodiment, only by reducing an opening angle of the second opening 222, the control valve may no longer have the fifth operating mode (e) and/or the sixth operating mode (f) in the previous embodiment, but rather have the first operating mode (a), the second operating mode (b), the third operating mode (c) and the fourth operating mode (d).

Figure 2:
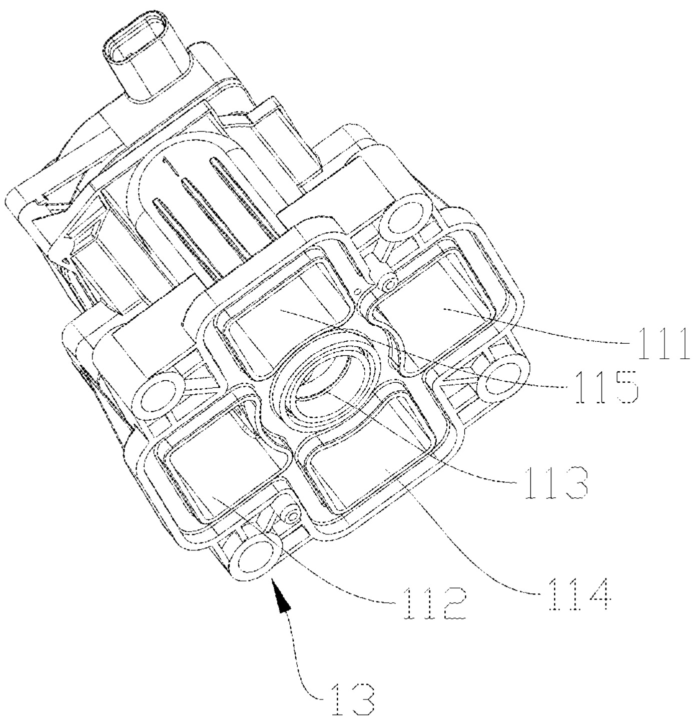
FIG. 2 is a schematic perspective view showing the structure of the control valve in FIG. 1 from another angle.
Figure 3:
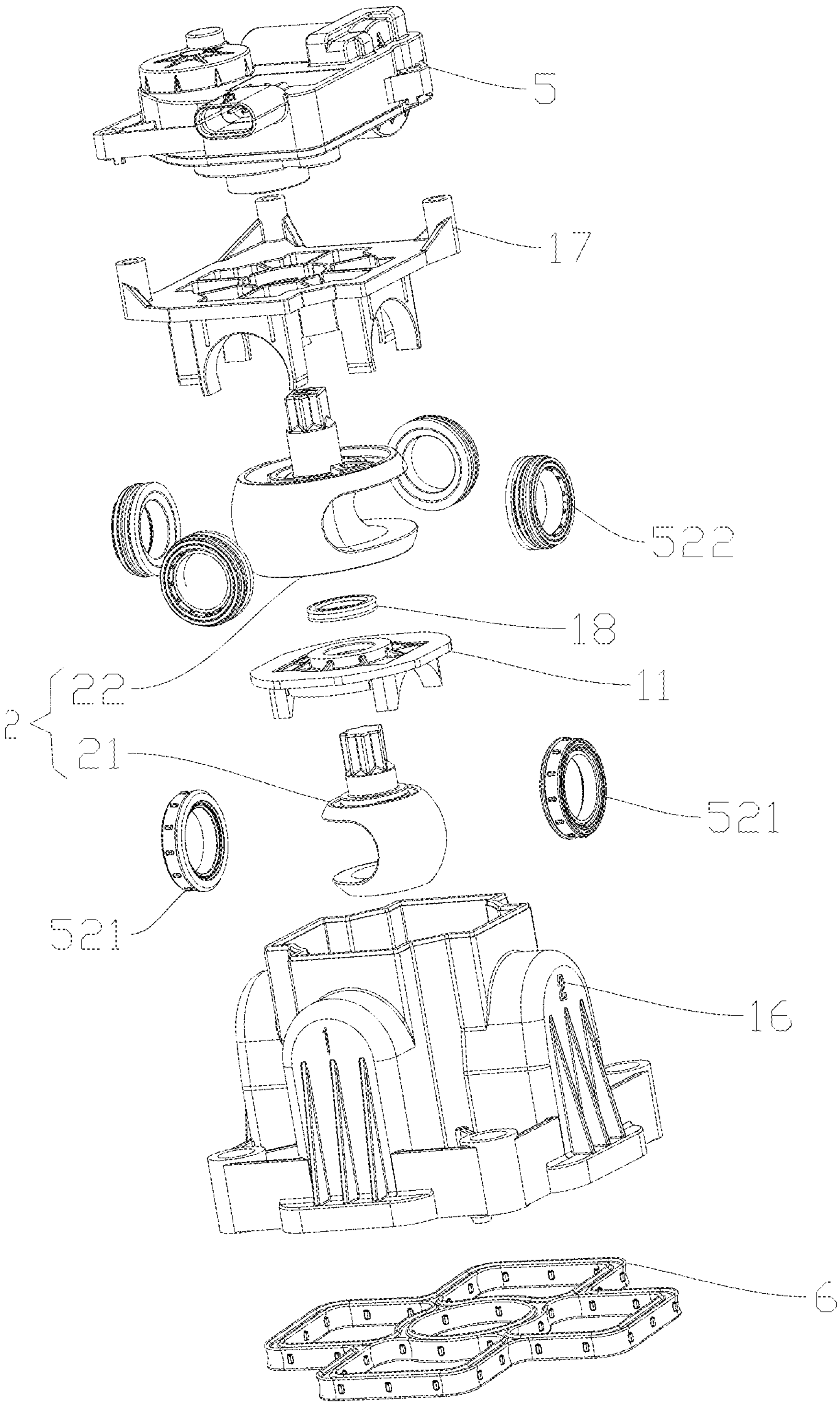
FIG. 3 is a schematic exploded view of the control valve shown in FIG. 1.
Figure 4:
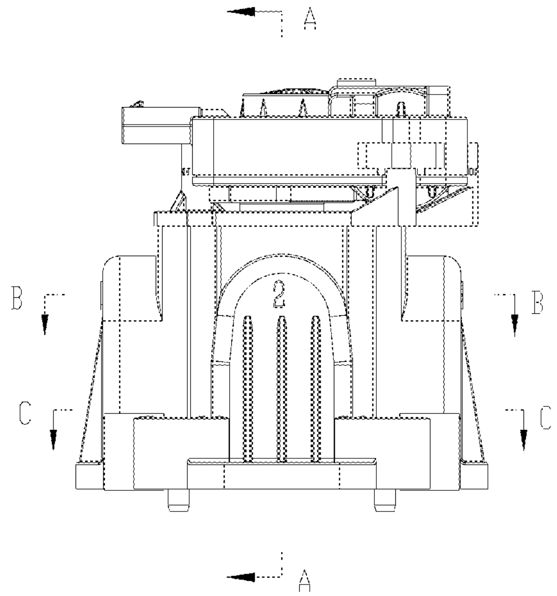
FIG. 4 is a schematic side view of the control valve shown in FIG. 1.
Figure 5:
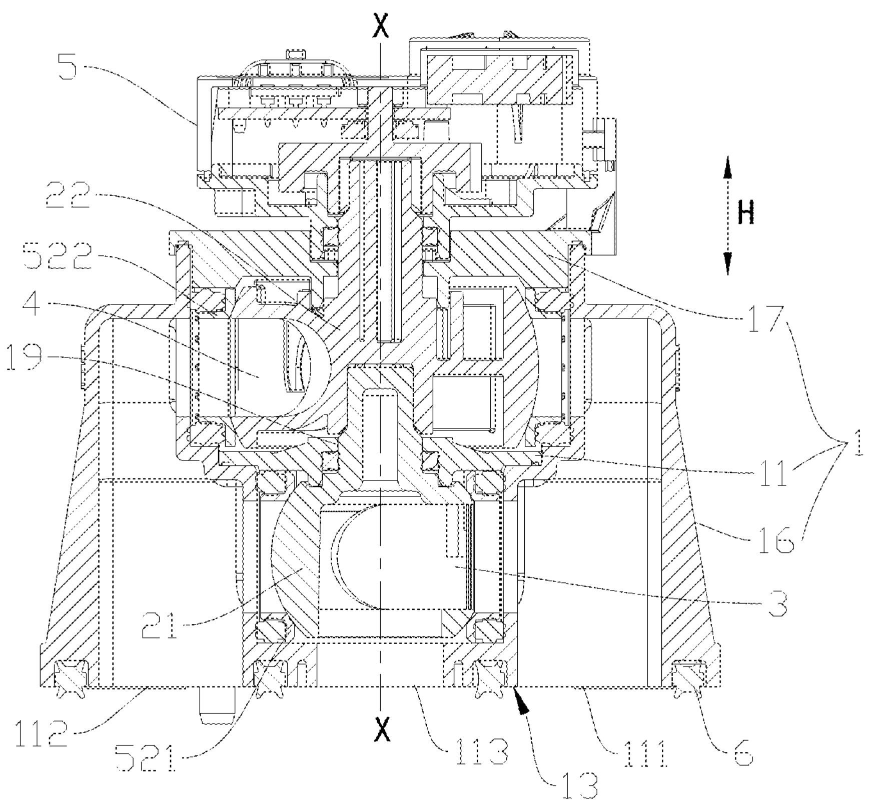
FIG. 5 is a schematic cross-sectional view showing the structure of the control valve in FIG. 4 taken along line A-A.
Figure 19:
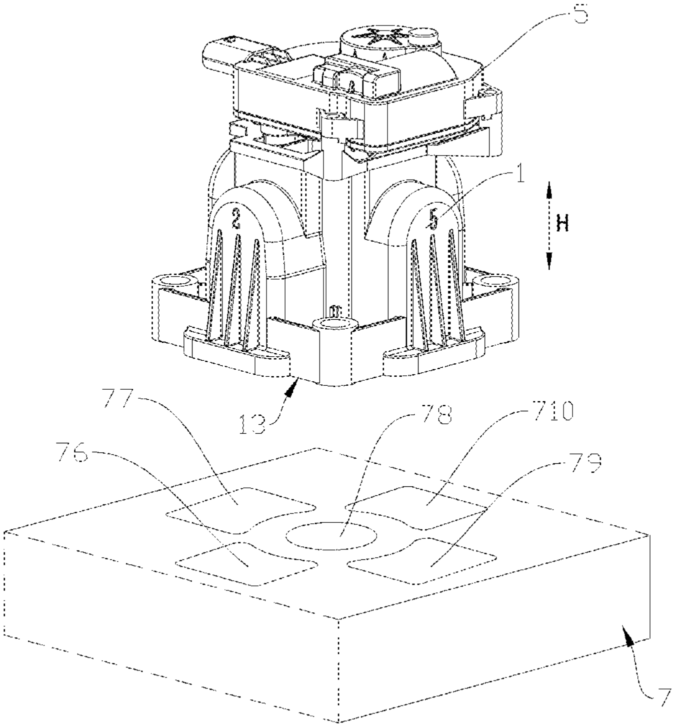
FIG. 19 is a schematic exploded view of a thermal management assembly.

FIG. 19 illustrates a part of a thermal management assembly. The thermal management assembly includes a flow passage plate 7 and the control valve as described above, which can be fixedly or limitedly connected to the flow passage plate 7. As shown in FIG. 2, FIG. 5, and FIG. 19, the valve assembly 1 has a first side portion 13. The fourth connection port 114, the first connection port 111, the third connection port 113, the second connection port 112, and the fifth connection port 115 are located in the first side portion 13; the fourth connection port 114, the first connection port 111, the third connection port 113, the second connection port 112 and the fifth connection port 115 are oriented in the same direction or substantially the same direction, and the first side portion 13 is used to be fixedly or limitedly connected to the flow passage plate 7. When the control valve is mounted with the flow passage plate 7, the fourth connection port 114, the first connection port 111, the third connection port, the second connection port 112 and the fifth connection port 115 can be communicated with corresponding ports of the flow passage plate 7 at the same time, which simplifies the mounting steps of the control valve and improves the assembly efficiency.

As shown in FIG. 5 to FIG. 9, in this embodiment, the first side portion 13 is located at one side of the valve body assembly 1 along the height direction H and substantially perpendicular to the rotation axis. The driving part 5 and the first side portion 13 are located at both sides of the control valve along the height direction H respectively. The fifth communication port 105 is located in substantially the same radial direction as the fourth connection port 114. The first communication port 101 and the second communication port 102 are located in substantially the same radial direction as the first connection port 111. The third communication port 103 and the fourth communication port 104 are located in substantially the same radial direction as the second connection port 112. The seventh communication port 107 is located in substantially the same radial direction as the fifth connection port 115. In this case, the length of the flow passage for communication between the connection port and the communication port can be reduced, which in turn reduces the flow resistance of the control valve, facilitates manufacturing, and facilitates molding of this flow passage. Along the height direction H, a projection of the sixth communication port 106 on the first side portion 13 coincides or partially coincides with the third connection port 113, which reduces the length of the flow passage for communication between the third connection port and the sixth communication port 106, thereby reducing the flow resistance and facilitating manufacturing.

As shown in FIG. 2 to FIG. 5, the fourth connection port 114, the first connection port 111, the second connection port 112 and the fifth connection port 115 are rotationally and symmetrically provided along the circumferential direction of the third connection port 113, which makes the control valve compact in structure. Moreover, the control valve may have an integral sealing gasket 6, and the control valve and the flow passage plate 7 are sealed by the sealing gasket 6, which simplifies the mounting steps of the control valve and improves the assembly efficiency.

Figure 20:
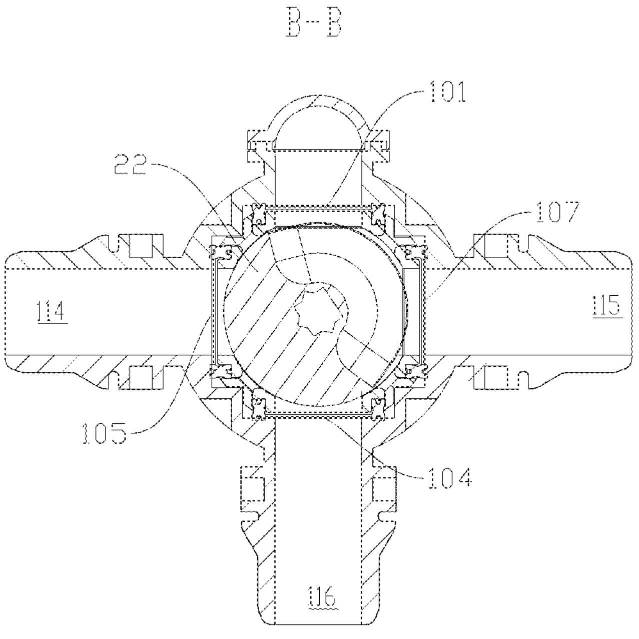
FIG. 20 is a schematic cross-sectional view showing the structure of a control valve according to another embodiment of the present application.
Figure 21:
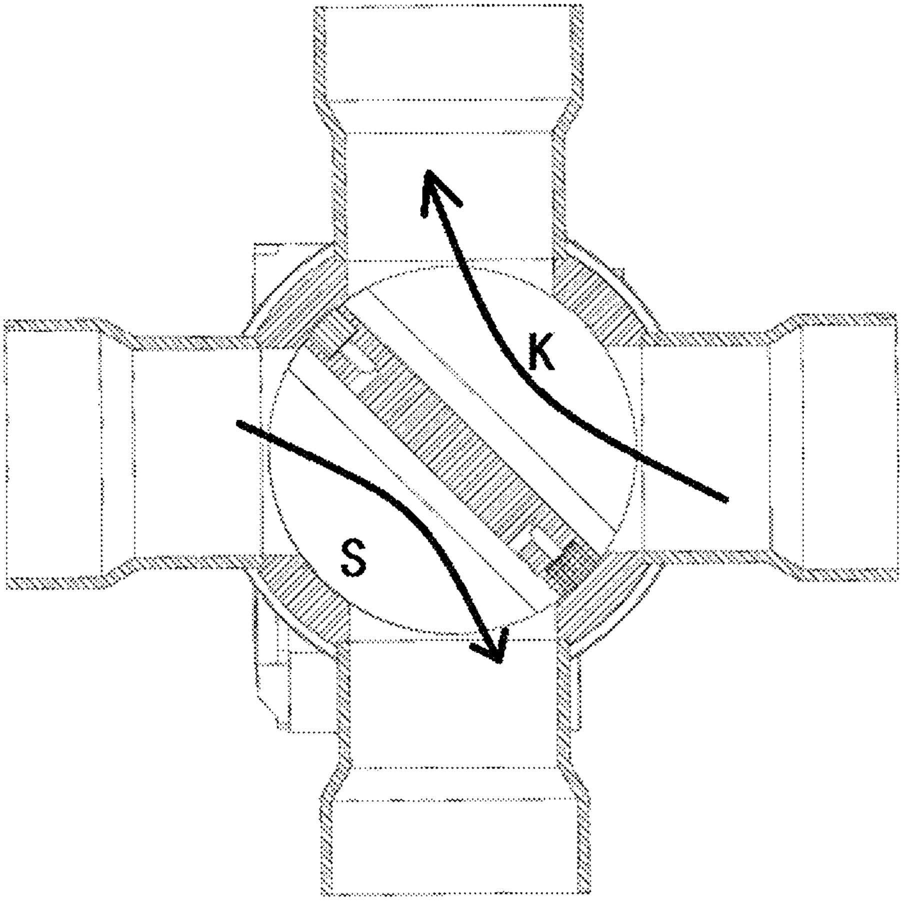
FIG. 21 is a cross-sectional view of a common multi-way valve.

In other embodiments, the flow passage between the connection port and the communication port may have other forms, as shown in FIG. 20. Compared to the previous embodiment, the flow passage between the communication port and the connection port may extend perpendicularly to the direction of the rotation axis and in a form of a radial shape, which can reduce the number of corners in the flow passage, thus reducing the flow resistance.

The control valve is used in a thermal management system. The thermal management system includes at least five pipelines (not shown in the figures), including a first pipeline, a second pipeline, a third pipeline, a fourth pipeline, and a fifth pipeline. Each of the five pipelines has a port at one end thereof, as shown in FIG. 19. The first pipeline has a first port 76 at one end thereof, the second pipeline has a second port 77 at one end thereof, the third pipeline has a third port 78 at one end thereof, the fourth pipeline has a fourth port 79 at one end thereof, and the fifth pipeline has a fifth port 710 at one end thereof.

The five connection ports of the control valve are abutted to and in communication with the above five ports in one-to-one correspondence. For example, in one embodiment where the control valve is connected to the thermal management system, the first port 76 is in communication with the fourth connection port 114, the second port 77 is in communication with the first connection port 111, the third port 78 is in communication with the third connection port 113, the fourth port 79 is in communication with the second connection port 112, and the fifth port 710 is in communication with the fifth connection port 115. In other embodiments, without changing the positions of the other components of the thermal management system and the communication relationship, by exchanging the port connecting with the fourth connection port 114 and the port connecting with the fifth connection port 115, or by exchanging the port connecting with the first connection port 111 and the port connecting with the second connection port 112, the six operating modes formed in the system are the same as in the previous embodiments. Thus, the control valve is adaptable to the thermal management systems or the flow passage plates with different piping arrangements, thus having a high versatility. In particular, for the flow passage plate 7, the control valve facilitates the arrangement of the internal pipes of the flow passage plate 7, which can reduce the staggering of the internal pipes and reduce the thickness of the flow passage plate 7.

The control valve in the above embodiments has five connection ports and seven communication ports. In other embodiments of the control valve, the number of the connection ports, the number of communication ports, and the number of the communicating portions may be changed accordingly, and the communication relationship between the connection ports and the communication ports may be changed so as to make it applicable to different communication situations. The number of the connection ports of the control valve may be five or more, the number of the communication ports of the control valve may be six or more, and the number of the communicating portions may be two or more. For example, the second valve core portion 22 may have two communicating portions. The number of the communication ports in communication with the same connection port may be two or more. For example, three communication ports are in communication with one connection port.

It should be noted that, the above embodiments are only intended to illustrate the present application rather than limit the technical solutions described in the present application. Although the present application is described in detail with reference to the embodiments in the present specification, it should be understood by those skilled in the art that, modifications or equivalent substitutions can still be made by those skilled in the art to the present application without departing from the spirit and scope of the present application, all of which should be covered within the scope of the claims of the present application.

The invention claimed is:

1. A control valve comprising a valve body assembly and a valve core assembly, wherein the valve body assembly is provided with a first cavity and a second cavity, at least part of the valve core assembly is located in the first cavity, and at least another part of the valve core assembly is located in the second cavity;

the valve body assembly is provided with a first communication port and a second communication port, wherein the second communication port is located at a wall defining the first cavity, and the first communication port is located at a wall defining the second cavity;

the valve body assembly has a first connection port and both the first communication port and the second communication port are in communication with the first connection port, the valve core assembly has at least a first operating position group and a second operating position group, when in the first operating position group, the valve core assembly is configured to close the second communication port and open the first communication port;

when in the second operating position group, the valve core assembly is configured to close the first communication port and open the second communication port;

the valve body assembly is further provided with a third communication port and a fourth communication port;

the third communication port is located at the wall defining the first cavity, and the fourth communication port is located at the wall defining the second cavity;

the valve body assembly further has a second connection port, and both the third communication port and the fourth communication port are in communication with the second connection port;

when in the first operating position group, the valve core assembly is configured to close the fourth communication port and open the third communication port; and when in the second operating position group, the valve core assembly is configured to close the third communication port and open the fourth communication port.

2. The control valve according to claim 1, wherein the valve body assembly is further provided with a seventh communication port, a fifth communication port and a sixth communication port;

the sixth communication port is located at the wall defining the first cavity, and the seventh communication port and the fifth communication port are located at the wall defining the second cavity; and the valve body assembly further has a fourth connection port, a third connection port and a fifth connection port, wherein the sixth communication port is in communication with the third connection port, the fifth communication port is in communication with the fourth connection port, and the seventh communication port is in communication with the fifth connection port.

3. The control valve according to claim 2, wherein at least part of the first cavity and at least part of the second cavity are located at different heights of the valve body assembly, and the valve core assembly comprises a first communicating portion and a second communicating portion, wherein the first communicating portion is located in the first cavity, and the second communication portion is located in the second cavity;

in the first operating position group, the first communication port is in communication with at least one of the seventh communication port and the fifth communication port through the second communicating portion, and the third communication port is in communication with the sixth communication port through the first communicating portion; and in the second operating position group, the fourth communication port is in communication with at least one of the seventh communication port and the fifth communication port through the second communicating portion, and the second communication port is in communication with the sixth communication port through the first communicating portion.

4. The control valve according to claim 3, wherein the control valve at least comprises at least one of the following four operating modes for selection:

in a first operating mode, the third connection port is in communication with the second connection port through the sixth communication port, the first communicating portion and the third communication port; the first connection port is in communication with the fifth connection port through the first communication port, the second communicating portion and the seventh communication port; and the fourth connection port is not in communication with any other connection ports;

in a second operating mode, the third connection port is in communication with the second connection port through the sixth communication port, the first communicating portion and the third communication port; the first connection port is in communication with the fourth connection port through the first communication port, the second communicating portion and the fifth communication port; and the fifth connection port is not in communication with any other connection ports;

in a third operating mode, the third connection port is in communication with the first connection port through the sixth communication port, the first communicating portion and the second communication port; the second connection port is in communication with the fourth connection port through the fourth communication port, the second communicating portion and the fifth communication port; and the fifth connection port is not in communication with any other connection ports; and in a fourth operating mode, the third connection port is in communication with the first connection port through the sixth communication port, the first communicating portion and the second communication port; the second connection port is in communication with the fifth connection port through the fourth communication port, the second communicating portion and the seventh communication port; and the fourth connection port is not in communication with any other connection ports.

5. The control valve according to claim 2, wherein the valve body assembly has a first side portion, the fourth connection port, the first connection port, the third connection port, the second connection port and the fifth connection port are all located at the first side portion, and the fourth connection port, the first connection port, the third connection port, the second connection port and the fifth connection port are oriented in the same direction or substantially the same direction.

6. The control valve according to claim 5, wherein the first side portion is configured for a fixed connection or a limited connection with a flow passage plate; and a height direction is defined, which is parallel or substantially parallel to an extension direction of an rotation axis of the valve core assembly, and along the height direction, the first side portion is located at one side of the valve body assembly.

7. The control valve according to claim 6, wherein the fifth communication port is located in a substantially same radial direction as the fourth connection port; the first communication port and the second communication port are located in a substantially same radial direction as the first connection port; the third communication port, the fourth communication port are located in a substantially same radial direction as the second connection port; the seventh communication port is located in a substantially same radial direction as the fifth connection port; and in the height direction, a projection of the sixth communication port on the first side portion coincides or partially coincides with the third connection port.

8. The control valve according to claim 5, comprising a driving part, wherein along a height direction of the control valve, the driving part and the first side portion are located on both sides of the control valve respectively, and the valve core assembly is configured to be driven by the driving part to rotate.

9. The control valve according to claim 1, wherein the valve body assembly comprises a housing and a partition wall portion, wherein the partition wall portion is at least partially located in the housing, and the partition wall portion separates the first cavity from the second cavity;

the partition wall portion is sealed with the valve core assembly, and the partition wall portion is sealed with the housing; or, the partition wall portion is integrally formed with the valve core assembly, and the partition wall portion is slidably sealed with the housing.

10. The control valve according to claim 9, wherein the partition wall portion is provided with a first through hole, at least part of the valve core assembly is located in the first through hole, and the valve core assembly is sealed with a wall defining the first through hole.

11. The control valve according to claim 1, wherein the valve core assembly comprises a first valve core portion and a second valve core portion, wherein the first valve core portion is in transmission connection with the second valve core portion, at least part of the first valve core portion is located in the first cavity, and at least part of the second valve core portion is located in the second cavity; and an outer wall of the first valve core portion is a part of a virtual spherical shape or column shape, and an outer wall of the second valve core portion is a part of a virtual spherical shape or column shape.

12. The control valve according to claim 11, wherein the second valve core portion is configured to drive the first valve core portion to rotate, and a radial size of the first valve core portion is smaller than that of the second valve core portion.

13. The control valve according to claim 11, wherein the control valve comprises at least one first sealing member and at least one second sealing member, wherein one of the at least one first sealing member is located around the second communication port, and one of the at least one second sealing member is located around the first communication port;

the at least one first sealing member is located between the wall defining the first cavity and the first valve core portion, and the at least one second sealing member is located between the wall defining the second cavity and the second valve core portion; and a part of the at least one first sealing member is complementary in shape to the outer wall of the first valve core portion and is configured to sealingly contact with the outer wall of the first valve core portion, and a part of the at least one second sealing member is complementary in shape to the outer wall of the second valve core portion and is configured to sealingly contact with the outer wall of the second valve core portion.

14. A thermal management system, comprising a control valve, wherein the control valve comprises a valve body assembly and a valve core assembly, the valve body assembly is provided with a first cavity and a second cavity, at least part of the valve core assembly is located in the first cavity, and at least another part of the valve core assembly is located in the second cavity;

the valve body assembly is provided with a first communication port and a second communication port, wherein the second communication port is located at a wall defining the first cavity, and the first communication port is located at a wall defining the second cavity;

the valve body assembly has a first connection port, and both the first communication port and the second communication port are in communication with the first connection port;

the valve core assembly has at least a first operating position group and a second operating position group;

when in the first operating position group, the valve core assembly is configured to close the second communication port and open the first communication port;

when in the second operating position group, the valve core assembly is configured to close the first communication port and open the second communication port;

the valve body assembly is further provided with a third communication port and a fourth communication port;

the third communication port is located at the wall defining the first cavity, and the fourth communication port is located at the wall defining the second cavity;

the valve body assembly further has a second connection port, and both the third communication port and the fourth communication port are in communication with the second connection port;

when in the first operating position group, the valve core assembly is configured to close the fourth communication port and open the third communication port; and when in the second operating position group, the valve core assembly is configured to close the third communication port and open the fourth communication port.

* * * * *